US012459861B2

United States Patent
Dossing et al.

(10) Patent No.: US 12,459,861 B2
(45) Date of Patent: Nov. 4, 2025

(54) DEVICE FOR PRODUCING SUPPLEMENTARY CEMENTITIOUS MATERIAL

(71) Applicant: Cemgreen APS, Hobro (DK)

(72) Inventors: Lasse Norbye Dossing, Roskilde (DK); Martin Hagsted Rasmussen, Lübeck (DK); Mogens Juhl Fons, Hadsund (DK)

(73) Assignee: Cemgreen APS, Roskilde (DK)

( * ) Notice: Subject to any disclaimer, the term of this patent is extended or adjusted under 35 U.S.C. 154(b) by 374 days.

(21) Appl. No.: 17/924,110

(22) PCT Filed: May 12, 2021

(86) PCT No.: PCT/EP2021/062740
§ 371 (c)(1),
(2) Date: Nov. 8, 2022

(87) PCT Pub. No.: WO2021/229009
PCT Pub. Date: Nov. 18, 2021

(65) Prior Publication Data
US 2023/0175777 A1  Jun. 8, 2023

(30) Foreign Application Priority Data
May 13, 2020  (EP) .................................... 20174299

(51) Int. Cl.
*F27B 1/00*  (2006.01)
*C04B 7/13*  (2006.01)
(Continued)

(52) U.S. Cl.
CPC ................ *C04B 7/527* (2013.01); *C04B 7/13* (2013.01); *C04B 7/12* (2013.01); *C04B 7/4469* (2013.01);
(Continued)

(58) Field of Classification Search
CPC ... F27D 1/00; F27D 1/005; F27D 1/08; F27D 15/006; F27D 15/10; F27D 15/0286; F26B 17/12
See application file for complete search history.

(56) References Cited

U.S. PATENT DOCUMENTS 218,673 A * 8/1879 Helbig et al. ........... F27B 1/005
432/100
1,551,424 A * 8/1925 Norrish ..................... F27B 1/08
202/124
(Continued)

FOREIGN PATENT DOCUMENTS

CN      208419572 U  *  1/2019
DE        1240626 B     12/1963
(Continued)

OTHER PUBLICATIONS

Extended European Search Report EP Application No. 20174299.6 (Oct. 22, 2020).
(Continued)

*Primary Examiner* — Gregory A Wilson
(74) *Attorney, Agent, or Firm* — Antoinette G Giugliano; Antoinette G Giugliano PC

(57) ABSTRACT

The present invention relates to a device for heat-treating solid material, in particular in granular form, wherein the device comprises a kiln and an external heat generator, wherein said kiln comprises at least one sloped sliding surface on which a bed of said solid material slides down within said kiln due to gravity while a hot gas generated by the external heat generator is led through said solid material to heat said solid material to a desired temperature in order to change the substance properties of said solid material. According to the invention, said external heat generator for generating said hot gas is external to said kiln, wherein said kiln further comprises at least one kiln gas inlet through
(Continued)

which said hot gas enters said kiln, such that the necessary temperature of said hot gas can be controlled precisely in that said hot gas is generated in said external heat generator, ensuring that the solid material does not experience temperatures above an allowed maximum temperature, and further such that the solid material is not exposed to radiation from a burner.

14 Claims, 13 Drawing Sheets

(51) Int. Cl.
| | | |
|---|---|---|
| *C04B 7/52* | (2006.01) | |
| *C04B 7/12* | (2006.01) | |
| *C04B 7/44* | (2006.01) | |
| *F27B 1/02* | (2006.01) | |
| *F27B 1/21* | (2006.01) | |
| *F27B 1/22* | (2006.01) | |
| *F27B 1/24* | (2006.01) | |
| *F27D 17/20* | (2025.01) | |

(52) U.S. Cl.
CPC ................ *F27B 1/005* (2013.01); *F27B 1/02* (2013.01); *F27B 1/21* (2013.01); *F27B 1/22* (2013.01); *F27B 1/24* (2013.01); *F27D 17/20* (2025.01); *F27M 2003/03* (2013.01); *Y02P 40/10* (2015.11)

(56) References Cited

U.S. PATENT DOCUMENTS

| | | | | |
|---|---|---|---|---|
| 3,544,090 A | * | 12/1970 | Peeters | ................... F27B 1/005 |
| | | | | 106/750 |
| 3,756,768 A | * | 9/1973 | Escott | ................... C22B 1/2413 |
| | | | | 432/79 |
| 4,718,984 A | * | 1/1988 | McConaghy, Jr | ........ C10L 9/08 |
| | | | | 201/34 |
| 5,013,237 A | * | 5/1991 | Bergounhon | ............. F27B 1/10 |
| | | | | 432/100 |
| 5,836,758 A | | 11/1998 | Menzel | |
| 6,082,021 A | | 7/2000 | Fons | |

FOREIGN PATENT DOCUMENTS

| | | | |
|---|---|---|---|
| DE | 102011050125 A1 | 11/2021 | |
| EP | 0341417 A2 * | 11/1989 | |
| GB | 000000927648 A | 5/1963 | |
| GB | 1071424 A * | 6/1967 | |
| GB | 000002176583 A | 12/1986 | |
| IT | 1101488 B * | 9/1985 | ............... B01J 8/12 |
| WO | WO001997007881 A1 | 3/1997 | |

OTHER PUBLICATIONS

Written Opinion of the International Searching Authority, PCT Application No. PCT/EP2021/062740 (Aug. 12, 2021).
International Search Report, PCT Application No. PCT/EP2021/062740 (Aug. 12, 2021).
Chinese Application No. 100036, Examination Report Jun. 6, 2023 with English Translation.

* cited by examiner

DEVICE FOR PRODUCING SUPPLEMENTARY CEMENTITIOUS MATERIAL

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A READ-ONLY OPTICAL DISC, AS A TEXT FILE OR AN XML FILE VIA THE PATENT ELECTRONIC SYSTEM

Not Applicable.

STATEMENT REGARDING PRIOR DISCLOSURES BY THE INVENTOR OR A JOINT INVENTOR

Not Applicable.

BACKGROUND OF THE INVENTION

Not Applicable.

BRIEF SUMMARY OF THE INVENTION

The present invention relates to a device for producing supplementary cementitious material (SCM). In particular, the present invention relates to a device for heat-treating solid material, in particular in granular form, wherein the device comprises a kiln and a heat generator, wherein the kiln is configured such that said solid material slides down within the kiln due to gravity along a sliding surface while a hot gas generated by the heat generator is led through said solid material to heat said solid material to a desired temperature in order to change the substance properties of said solid material.

The present invention also relates to a device according to the preamble of independent claim 2.

The cement industry is currently forced and struggling to reduce energy consumption in general and, specifically, to reduce the associated CO2 emissions. The energy consumption for transforming limestone into cement is dictated by chemistry. Today, the cement industry uses supplementary cementitious materials in order to reduce production and energy costs thereby also reducing the CO2 emissions. The supplementary cementitious materials are usually bi-products stemming from other industries. Due to governmental regulations, many of these supplementary cementitious materials are currently being phased out, which poses a great problem to the cement industry due to an unsecure supply chain. Fly ash which is by far the most common supplementary cementitious material today, is a waste product from coal-fired power plants. Since many plants are closing down to meet the general demand for fossil fuel reduction, fly ash becomes limited and is already a very limited resource in some regions. An alternative supplementary cementitious material is a rock called shale, clay, clay, claystone, slate or mudstone that contains clay minerals pertaining to the Kaolin group, Smectite group, Illite group, Chlorite group or a combination thereof, which after a correct heat treatment in the temperature range of 700-980° C. will exhibit cementitious properties. A minimum temperature of 700° C. is required to activate the material and at the same time it is important not to exceed a maximum temperature of 980° C. So, it must be ensured that the core of the shale lumps or granules has experienced the required minimum temperature to become reactive and the surface of the shale lumps has not exceeded the maximum temperature. It is essential that the heat treatment is carried out in this narrow temperature window with a specific retention time in order to obtain the right properties of the final product.

A device of the type mentioned in the beginning is known, for example, from GB 2009900 A. The device described in GB 2009900 A comprises an upper preheating section for preheating the solid material (for example raw cement material), a kiln section in the middle in which the actual heat-treatment takes place, and a lower cooling section in which the heat-treated material is cooled down to such a temperature that the final product can be discharged at a lower end of the device. The kiln section is formed by a combustion chamber and comprises a sloped sliding surface along which the solid material may slide down. The combustion chamber is heated by one or more internal burners. The hot gas generated by the burners strikes the surface of the material and also penetrates through the material. For this purpose, the sloped sliding surface is formed by gas-permeable structural supports arranged within the combustion chamber. Several mechanical pusher devices in the form of reciprocating sliders are necessary to effect movement of the material along the supports.

The object of the present invention is to provide a device of the type described in the beginning which allows an efficient production of supplementary cementitious material with a very precise temperature window.

In the case of a device for heat-treating solid material, in particular in granular form, wherein the device comprises a kiln and an external heat generator, wherein said kiln is configured such that said solid material slides down within said kiln due to gravity along a sliding surface while a hot gas generated by the heat generator is led through said solid material to heat said solid material to a desired temperature in order to change the substance properties of said solid material, a solution of the object according to the invention exists if said heat generator for generating said hot gas is external to said kiln, wherein said kiln further comprises at least one kiln gas inlet through which said hot gas enters said kiln.

One major advantage of the present invention is that the necessary temperature of the hot gas can be controlled precisely in that the hot gas is generated in an external heat generator and if required adjusted with air or gas before entering the kiln. Thus, it can be ensured that the material does not experience temperatures above the allowed maximum temperature. Furthermore, the material is not exposed to radiation from an internal burner. Preferably, the gas is homogenized with respect to temperature in the full cross-sectional area of the flow before entering the kiln. Precisely controlling the temperature window of the hot gas led to the kiln allows a complete and efficient calcination of, for example, shale as a preferred supplementary cementitious material of the present invention. The device according to the present invention preferably comprises a control for controlling the temperature of the generated hot gas. In case of shale as a raw material for the production of supplementary cementitious material, the temperature may preferably be within the range of from 700° C. to 980° C. Different heat generators may be used. For example, the heat generator may be a separate combustion unit and/or a heat exchanger and/or any other suitable heat generating device. For example, the heat generator may be a device selected from the group comprising a combustion unit, electrical furnace, a solar power, a waste heat device, a heat storage unit, a plasma burner or a combination thereof.

Advantageous embodiments of the present invention are the subject of the dependent claims.

According to an embodiment of the present invention, said kiln comprises at least one sloped sliding surface on which a bed of said solid material slides down while said hot gas is led through said solid material. The heat transfer is preferably achieved in a cross-flow configuration. This embodiment offers the advantage that the heat transfer from the hot gas to the solid material is repeatable, can easily be controlled, and is highly efficient. The embodiment adds to a homogenous heat treatment of the solid material. The heat transfer may be influenced by the height of the bed of solid material. In yet another embodiment of the invention, the bed height is adjustable via a suitable adjusting mechanism. The sloping angle of the sloped sliding surface to the horizontal is preferably in the range of from 10° to 55°, and further preferably from 20° to 40°.

In an alternative embodiment of the present invention, said kiln is formed by a simple pipe in which said solid material slides down due to gravity. This embodiment offers the advantage of a counter flow and a simple and rugged design. The pipe is preferably a vertical pipe in which the solid material slides down only due to gravity. The sliding movement may be controlled by a discharge device arranged at a lower end of the pipe and working at a certain discharge rate. The kiln gas inlet may be formed by a plurality of slots or perforations in the pipe's wall. Preferably, the kiln gas inlet is formed by a plurality of slots extending parallel to an axis of the pipe. It is further advantageous if a portion of the pipe comprising said kiln gas inlet conically widens in a downward direction. Thus, blocking of material in the region of the kiln gas inlet is inhibited. It is further advantageous if the pipe is surrounded by an annular manifold through which the hot gas is guided and distributed to the slots or perforations in the pipe's wall.

The object is alternatively achieved by the features of independent claim 2. Accordingly, in the case of a device according to the preamble of the independent claim 2, a solution of the object according to the invention exists if said sliding surface is adapted to allow an isokinetic motion of said solid material along said sliding surface. Isokinetic is defined as all particles in a cross-sectional view perpendicular to the transport direction, will have the same displacement within a specific time period. The main advantage of the alternative solution is that the heat transfer is efficient, repeatable and easy to control. An isokinetic motion of the solid material is achieved if no vertical mixing of the layers of the bed of solid material occurs. Ideally, the relative position of each material particle remains the same with regard to the neighboring material particles while the bed of solid material slides down along the sliding surface. The isokinetic motion requires that the sliding surface does not have any barriers or thresholds that would lead to a local blocking and, subsequently, to a mixing or retention of the solid material. The alternative solution at the same time constitutes a preferred embodiment of the solution according to claim 1.

The expression "solid material slides down within the kiln due to gravity along a sliding surface" in accordance with the present invention means that the kiln is configured such that the material automatically slides down along the sliding surface merely due to gravity and without the need of any pusher or moving means of the kiln. Consequently, and according to yet another preferred embodiment of the present invention, the kiln does not comprise any moving parts that come into contact with said solid material. This adds to a simple construction and leads to low maintenance efforts.

According to another preferred embodiment of the present invention, said sliding surface is formed by at least one grate plate through which said hot gas passes. This embodiment allows a highly efficient crossflow heat exchange between hot gas and solid material. The hot gas may flow from a space above the bed of solid material through the bed of solid material and subsequently through respective openings in the grate plate. Alternatively, the hot air may pass from underneath the grate plate through grate plate and solid material to the space above the bed of solid material.

It is particularly advantageous if said grate plate comprises a plurality of small gas openings through which said hot gas passes, wherein a combined flow cross-section of said plurality of small gas openings is smaller than a combined flow cross-section formed by spaces between the overlying solid material. This ensures a certain dynamic pressure drop which results in a uniform and controlled gas flow through the whole grate plate.

In a particularly preferred embodiment of the present invention, the grate plate comprises a plurality of overlapping slats that are preferably formed as solid slats. This adds to a simple and rugged design and at the same time ensures that the grate plate does not comprise barriers or thresholds that would inhibit the desired isokinetic sliding motion of the solid material, at least when the solid material slides along an upper surface of one of the slats from one step formed by the overlap of two consecutive slats to a next lower step formed by the overlap of two consecutive slats. The slats overlap in a roof tile manner. Preferably, the slats extend in a direction which is orthogonal to a lengthwise direction of the grate plate. Advantageously, a sloping angle of the slats may be adjustable in order to adjust the size of the slots or gaps between the slats allowing to control flow rate and dynamic pressure drop of the hot gas passing through the grate plate.

It is particularly preferred, if a sloping angle $\alpha$ between the horizontal plane and an upper surface of each slat is greater than or equal to 10°, and further preferred greater than or equal to 20°. It is further particularly preferred if a resulting angle $\beta$ of the grate plate, the resulting angle $\beta$ of the grate plate being defined between the horizontal plane and an enveloping plane touching the lower ends of the overlapping slats, is less than or equal to 55°, further preferred less than or equal to 45°. Preferably, it is ensured that the resulting angle $\beta$ of the grate plate is less than the angle of repose of the solid material. The above defined angle range between 10°, preferably 20°, and 55°, preferably 45°, must be respected in order to allow isokinetic motion of the solid material.

According to another preferred embodiment of the present invention, the overlapping slats of the grate plate are held such that a gap is formed between a lower end of the respective overlapping slat and an upper end of the respective overlapped slat, the gaps between the overlapping slats forming gas openings through which said hot gas passes. Preferably, no further gas openings are formed in the slats themselves. This embodiment adds to an unhindered isokinetic motion of the solid material and ensures that the gas openings through which the hot gas passes are not clogged by small particles of the solid material. Preferably, the thickness of the gaps is in the range between 1 mm and 10 mm, preferably between 1.5 mm and 5.0 mm. It is also preferred, that a gap to slat length ratio is less than 0.7, more preferably less than 0.5, most preferably less than 0.4, wherein the slat length is defined as the non-covered length of a slat measured in the sloping direction According to yet another preferred embodiment of the present invention, the thickness of the slats, at least of a portion of the slat that overlaps another slat, is within the range between 1 mm and 10 mm, preferably between 2 mm and 5 mm.

According to yet another preferred embodiment of the present invention, said kiln comprises several sloped sliding surfaces arranged in a zigzag manner one above the other. In other words, several sloped sliding surfaces are disposed stepwise at a distance one above the other with opposing directions of slope. The solid material can slide through the kiln in cascade from one sliding surface to another. This adds to a compact design. The transition zone between two opposite sloping sliding surfaces is preferably formed by a short vertical duct which allows tumbling of the solid material to a certain degree, thereby uniforming the granulate temperature. The short vertical duct also allows some retention time without a dedicated cross flow of hot gas such that internal heat transfer within the solid material may occur.

According to yet another preferred embodiment of the present invention, said kiln comprises several kiln sections, wherein each kiln section is provided with a separate kiln gas inlet. This ensures that each kiln section is provided with fresh hot gas at an ideal temperature. Preferably, the device according to the invention is configured such that the hot gas is provided to the kiln gas inlets of said several kiln sections at a temperature within one and the same temperature range, preferably within the range of from 700° C. to 980° C. The used hot gas which has cooled down to a temperature below the ideal temperature range is preferably extracted from the device at the end of each kiln step. Each kiln step may therefore comprise a corresponding kiln gas outlet through which the cooled down gas is extracted. The slightly cooled down gas may be used for other purposes. According to a particularly advantageous embodiment, the cooled down kiln gas is led via a bypass duct to a preheater of the device in which the solid material is preheated before it enters the kiln. The embodiment adds to a high efficiency.

According to another preferred embodiment of the present invention, each of the above mentioned kiln sections may comprise one of the above mentioned opposite sloping sliding surfaces respectively.

According to another particularly preferred embodiment of the present invention, said device further comprises a preheater for preheating said solid material before it enters the kiln and a cooler for cooling said heat-treated solid material exiting said kiln, wherein cooler, kiln and preheater are arranged in vertical alignment one above the other. This embodiment adds to a very compact design of the device and ensures a high efficiency. Preheater, kiln and cooler are preferably arranged within a vertical tower. This again adds to a compact design and avoids energy losses. The solid material is fed into the device at an upper end of the tower and then successively proceeds through preheater, kiln and cooler at the lower end of which it is discharged from the device.

According to another particularly preferred embodiment of the present invention, the device further comprises at least one bypass for guiding cooling gas used for cooling the heat-treated solid material in the cooler, after having been heated by the heat-treated solid material, to the preheater. This embodiment adds to an improved energy efficiency. A valve may be arranged within the bypass duct in order to control the mass flow of heated gas led from the cooler to the preheater. Cooling gas enters the cooler at a lower end of the cooler and is led upstream through the heat-treated material. The bypass duct inlet is therefore preferably arranged at an upper end of the cooler. The heated cooling gas is preferably guided to a lower end of the preheater. It may also be fed into the preheater at several points. Alternatively, the heated cooling gas may be used for other purposes.

According to another preferred embodiment, the preheater comprises several preheating sections in which preheating of the solid material occurs in several preheating steps, wherein the cooler comprises several cooling sections in which cooling of the solid material occurs in several cooling steps, and wherein the device is preferably adapted and configured such that gas can be extracted or added in at least one, preferably in several, and even more preferred in all of said preheating and cooling steps. Each step is effected in one of said several sections. The extracted gas may be used for example for combustion in the heat generator or for temperature adjustment before it enters for example into the kiln section.

According to another embodiment of the present invention, preheater and cooler are designed analogous to said kiln such that said solid material slides down due to gravity through said preheater, said kiln and said cooler. If the kiln comprises grate plates, then preheater and cooler preferably also comprise grate plates forming sloped sliding surfaces along which the solid material slides down due to gravity. The arrangement and relative positioning of the grate plates is preferably such that a first height of the bed of solid material in the kiln is lower than a second height of the bed of solid material in the preheater and lower than a third height of the bed of solid material in the cooler. Advantageously, preheater and cooler comprise more steps or opposite sloping sliding surfaces than the kiln. According to an exemplary embodiment of the present invention, preheater and cooler each may comprise four opposite sloping sliding surfaces formed by grate plates whereas the kiln comprises only two opposite sloping sliding surfaces formed by grate plates.

If the kiln is formed by a pipe according to the alternative embodiment described above, then preheater and cooler may also be formed by a pipe or by a further section of said pipe. Alternatively, preheater and cooler may comprise sloped sliding surfaces formed by grate plates as described above whereas the kiln is formed by a pipe.

According to another preferred embodiment of the present invention, the device further comprises a discharging device for extracting said solid material at a lower end of said cooler at a controlled discharging rate. This allows a controlled retention time of the solid material within preheater, kiln and cooler. The discharge device may for example be a reciprocating bar that pushes solid material to the side at a certain frequency.

According to another preferred embodiment of the present invention, the device comprises at least one absorbing or catalyzing section in which the gas is led through an absorbent or catalyzing material in order to reduce the emissions of, for example, SO2, HCl, TOC, NOx etc. The absorbing or catalyzing section may be the top section of the device, in particular the top section of the preheater. If the absorbing or catalyzing section is not the top section, then the solid material to be heat treated is by-passed past the absorbing or catalyzing section. This embodiment has the advantage that emissions can be reduced.

According to another particularly preferred embodiment of the present invention, the device is adapted to processing supplementary cementitious material. In other words, the device is preferably a calcination device for the production of supplementary cementitious material. In a particularly preferred embodiment of the present invention, the device is configured to processing shale at a calcination temperature of 700° C. to 980° C.

BRIEF DESCRIPTION OF THE SEVERAL VIEWS OF THE DRAWINGS

Embodiments of the present invention shall be explained in more detail hereinafter with reference to the drawings.

DETAILED DESCRIPTION OF THE INVENTION

Figure 1:
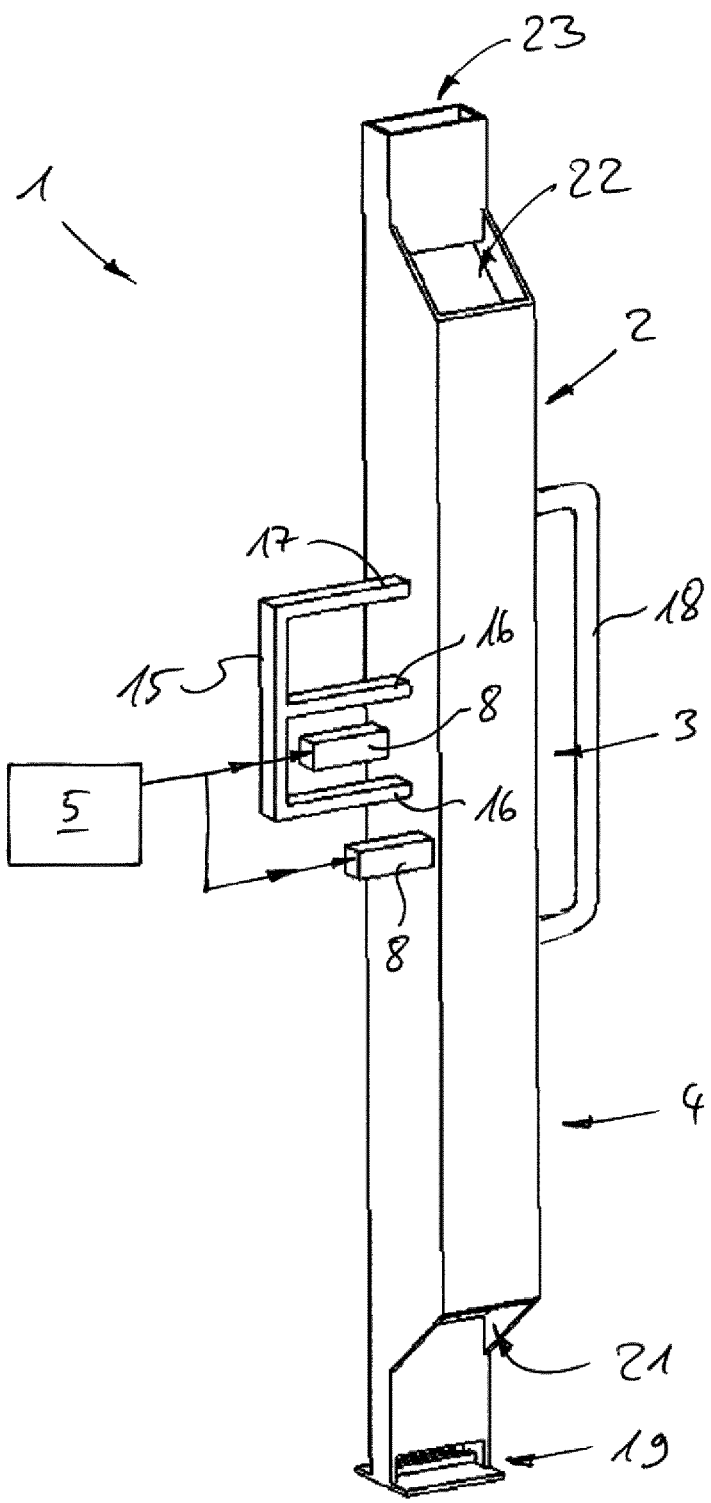
FIG. 1 shows a perspective front view of a device according to a first embodiment of the present invention.
Figure 2:
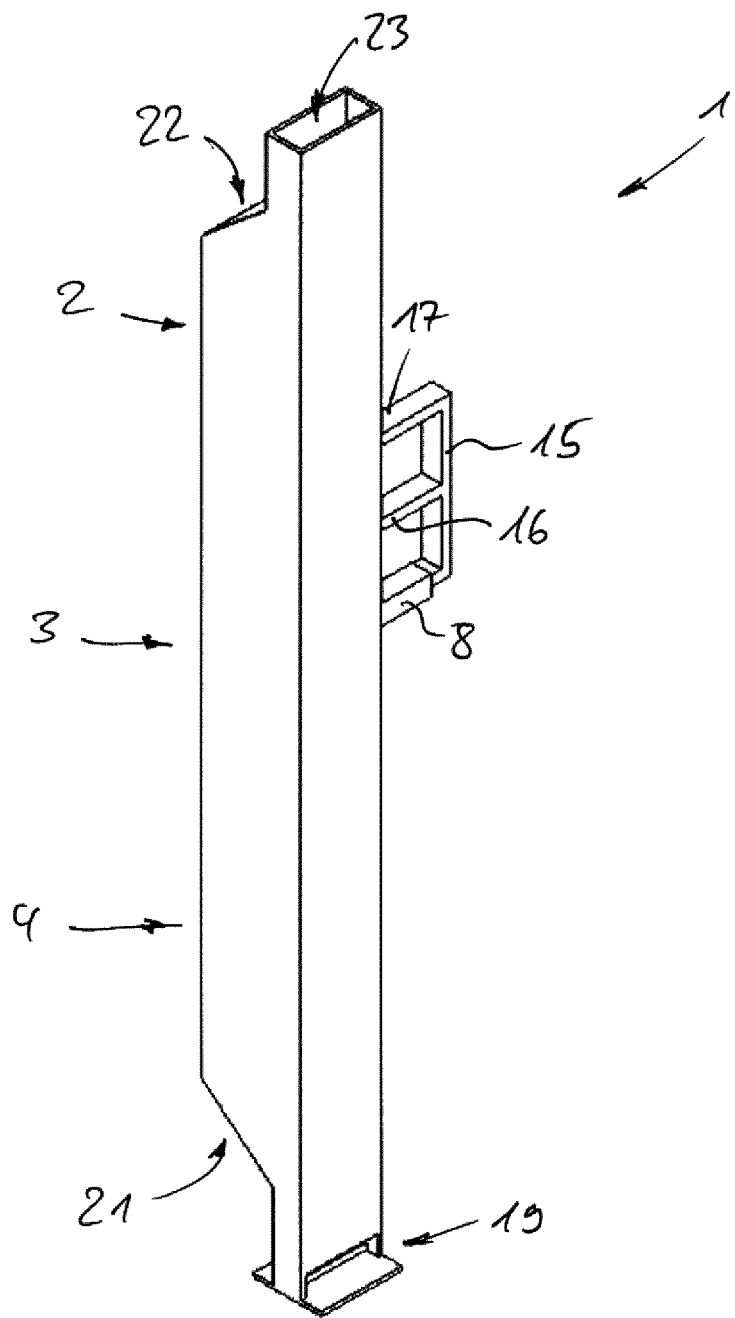
FIG. 2 shows a perspective rear view of the device shown in FIG. 1.
Figure 3:
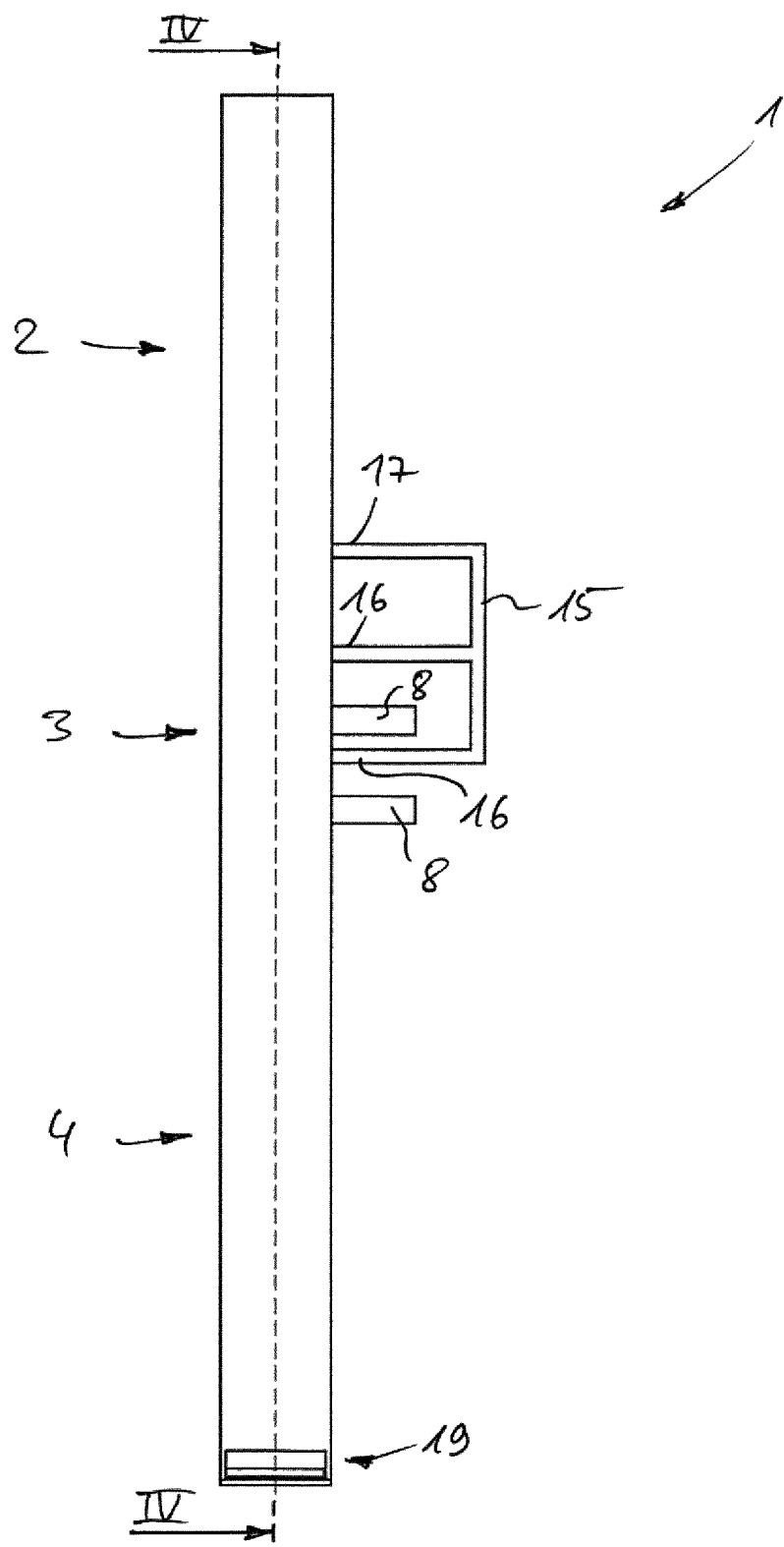
FIG. 3 shows a side view of the device shown in FIGS. 1 and 2.
Figure 4:
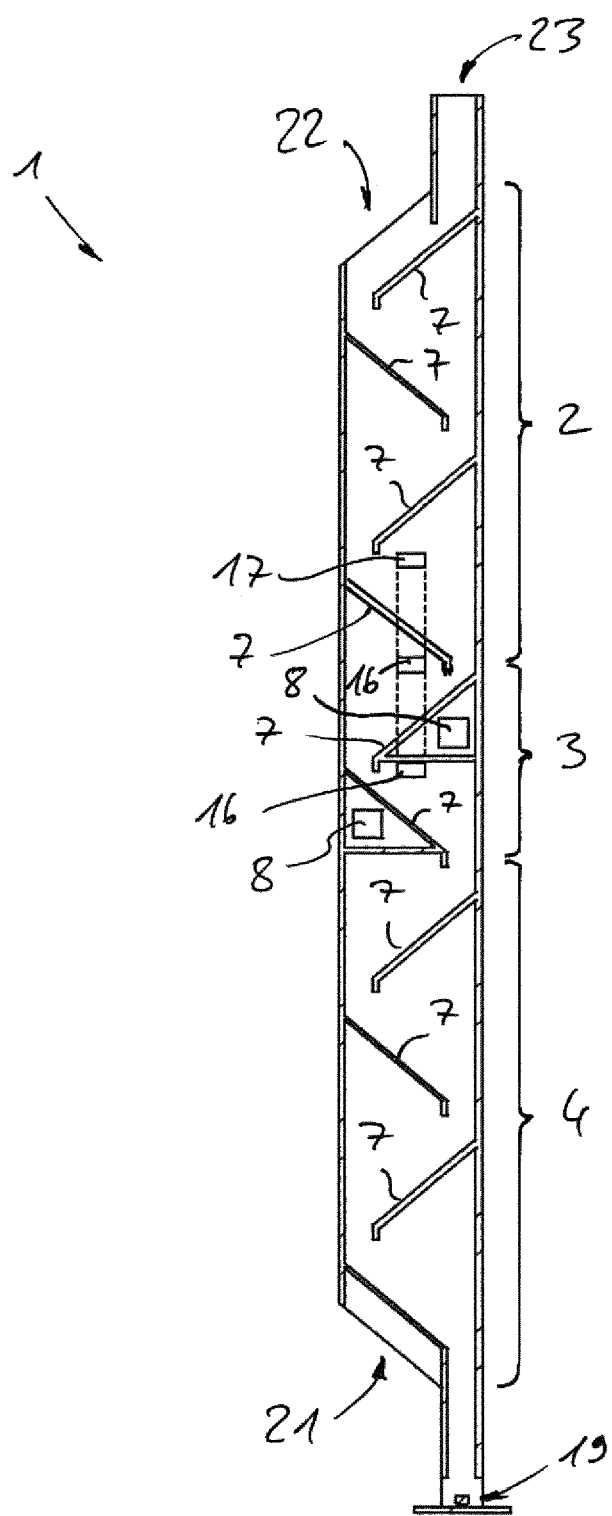
FIG. 4 shows a longitudinal section view of the device shown in FIGS. 1 to 3 along section line IV indicated in FIG. 3.

A first embodiment of a device 1 according to the present invention is shown in FIGS. 1 to 4 whereas FIG. 1 shows a perspective front view, FIG. 2 shows a perspective rear view, FIG. 3 shows a side view, and FIG. 4 shows a longitudinal section view along the section line IV indicated in FIG. 3.

The device is configured as a vertical tower with a feeder 23 at its top end for feeding granular material into the device. The granular material, preferably shale, experiences a heat treatment when passing through the device such that the shale is calcinated. The finished product is discharged from the device at a lower end of the tower via a suitable discharging device 19 which may be formed by a reciprocating bar pushing the granular material out of the discharge opening at a certain controllable rate. As best shown in FIG. 4, the device 1 comprises an upper preheater 2, a kiln 3 in the middle, and a cooler section 4 forming a lower portion of the tower.

The granular material is first preheated in the preheater 2, then passes on to the kiln 3 in which the calcination takes place, and is subsequently cooled down in the cooler 4 to an acceptable outlet temperature. According to the invention, the hot gas required in the kiln 3 for calcining the granular material is not generated within the kiln by a burner as is conventional in the prior art. Instead, the hot gas is generated in an external heat generator 5. The external generation of hot gas has the advantage that the temperature can be precisely controlled such that the material experiences an ideal temperature or temperature range. The hot gas enters the kiln via the kiln gas inlets 8 shown in FIGS. 1 to 4.

Cooling gas for cooling the heat-treated or calcinated solid material in the cooler 4 is led into the cooler 4 via a gas inlet 21 at a lower end of the cooler 4. The cooling gas flows upwards within the tower while the solid material moves in a downward direction. At the upper end of the cooler 4, the cooling gas which has been heated up by then to a temperature slightly below the temperature of the hot gas used in the kiln may be bypassed via bypass 18 to the lower end of preheater 2 without passing through the kiln 3. A valve may be arranged within the bypass 18 for controlling the flow of bypassed heated cooling gas.

As shown in FIG. 4, a plurality of opposite sloped sliding surfaces formed by grate plates 7 are arranged within the tower such that the granular material can slide down through preheater 2, kiln 3 and cooler 4 in cascade from one grate plate 7 to another. In the exemplary embodiment, preheater and cooler each comprise four grate plates 7 whereas the kiln comprises two grate plates 7. Each grate plate 7 represents one section of preheater, kiln and cooler. As shown in FIG. 4, the kiln 3 comprises two sections. Each of these two sections is provided with a separate kiln gas inlet 8 such that each section is provided with fresh hot gas from below the respective grate plate 7. At the upper end of each kiln section, after heat-transfer between hot gas and solid material has taken place, the used and cooled down gas is extracted from the kiln via a bypass inlet 16. The cooled gas is led to the preheater 2 via a second bypass 15 and enters the preheater 2 via bypass outlet 17. The gas led to the preheater 2 is vented through gas outlet 22 at the upper end of the tower. Preferably, a suction fan is provided within the gas outlet in order to control the flow rate of the gas.

Figure 5:
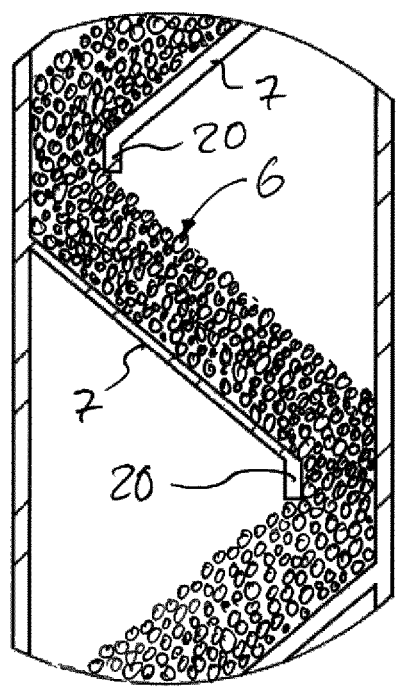
FIG. 5 shows a detail view of neighboring grate plates of the device shown in FIG. 4.
Figure 6:
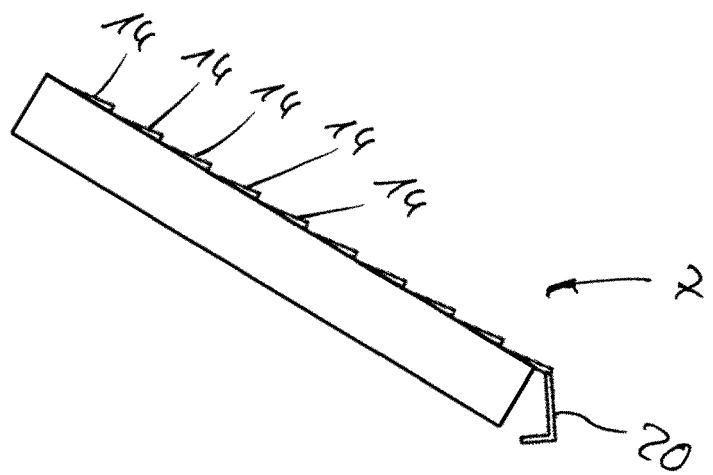
FIG. 6 shows a side view of a grate plate of the device shown in FIGS. 1 to 5.
Figure 7:
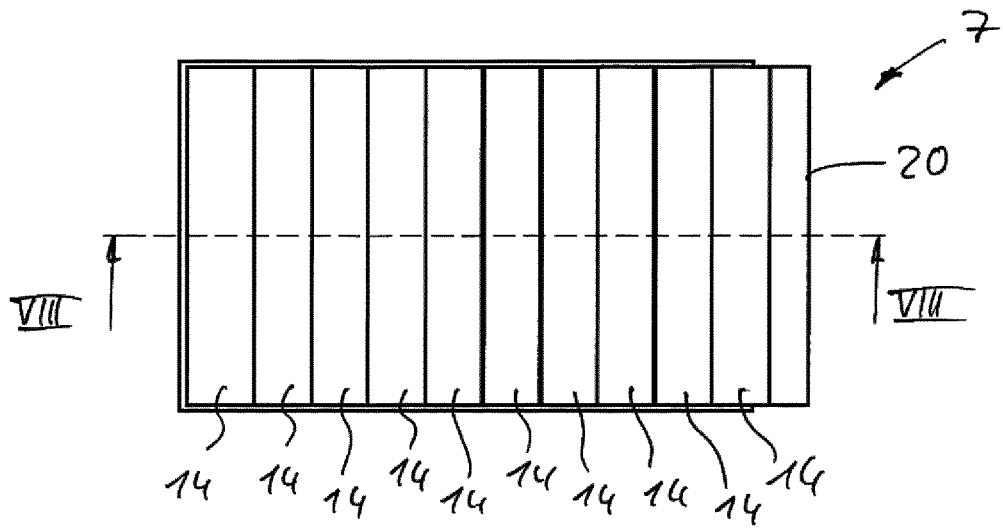
FIG. 7 shows a top view of the grate plate shown in FIG. 6.
Figure 8:
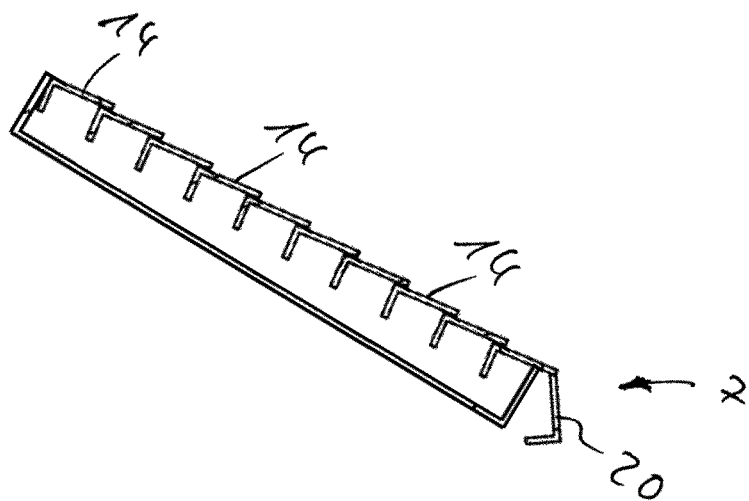
FIG. 8 shows a section view of the grate plate shown in FIGS. 6 and 7 along section line VIII indicated in FIG. 7.

FIG. 5 shows a detail view of the grate plates 7 and the bed of solid granular material 6 sliding down along the upper surface of the sloped grate plates 7. The grate plates 7 are configured such that the bed of solid granular material 6 performs an isokinetic sliding motion. This means that no vertical mixing between the layers of the bed occurs. The isokinetic motion is a precondition for an efficient heat transfer. As shown in FIG. 5, the lower end 20 of each grate plate 7 forms a short vertical duct with the neighboring wall of the tower which allows tumbling of the granular material in a transition zone between two consecutive grate plates 7. The tumbling leads to a more uniform temperature within the granular solid material before the material enters the next section. FIG. 5 also shows that the height of the bed of solid material 6 is calibrated by the distance between the lower end of an upper grate plate and the upper end of the consecutive grate plate. According to an embodiment of the invention, the height of the bed of solid material 6 may be adjustable via a suitable adjusting mechanism which increases or decreases the distance between the lower end 20 of the upper grate plate and the upper end of the consecutive grate plate. As can be seen in FIG. 4, the height of the bed of solid material in the kiln sections is lower than the height of the bed of solid material in the preheater and cooler sections. The lower bed height in the kiln sections ensures that all the material layers are within a certain temperature window.

Figure 9A:
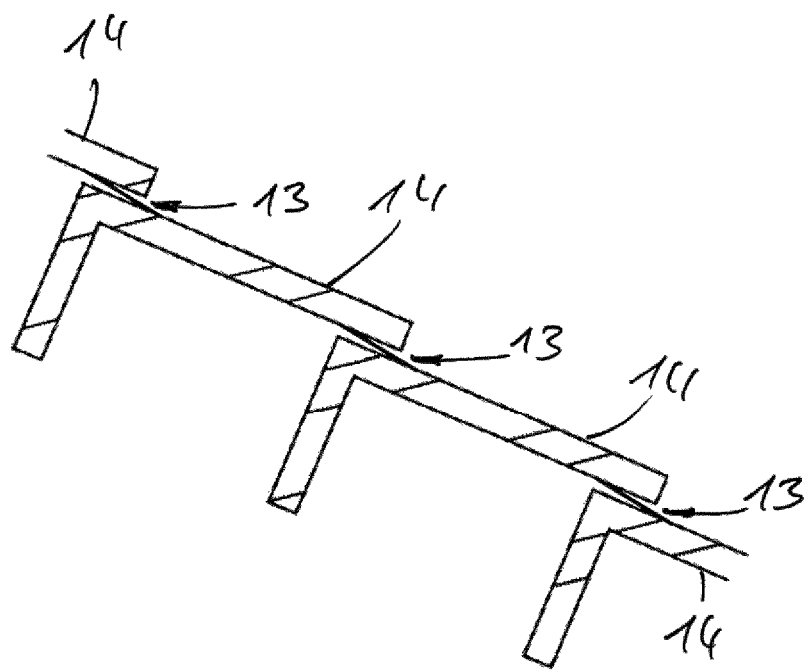
FIG. 9a shows a detail view of overlapping slats of the grate plate shown in FIG. 8.
Figure 9B:
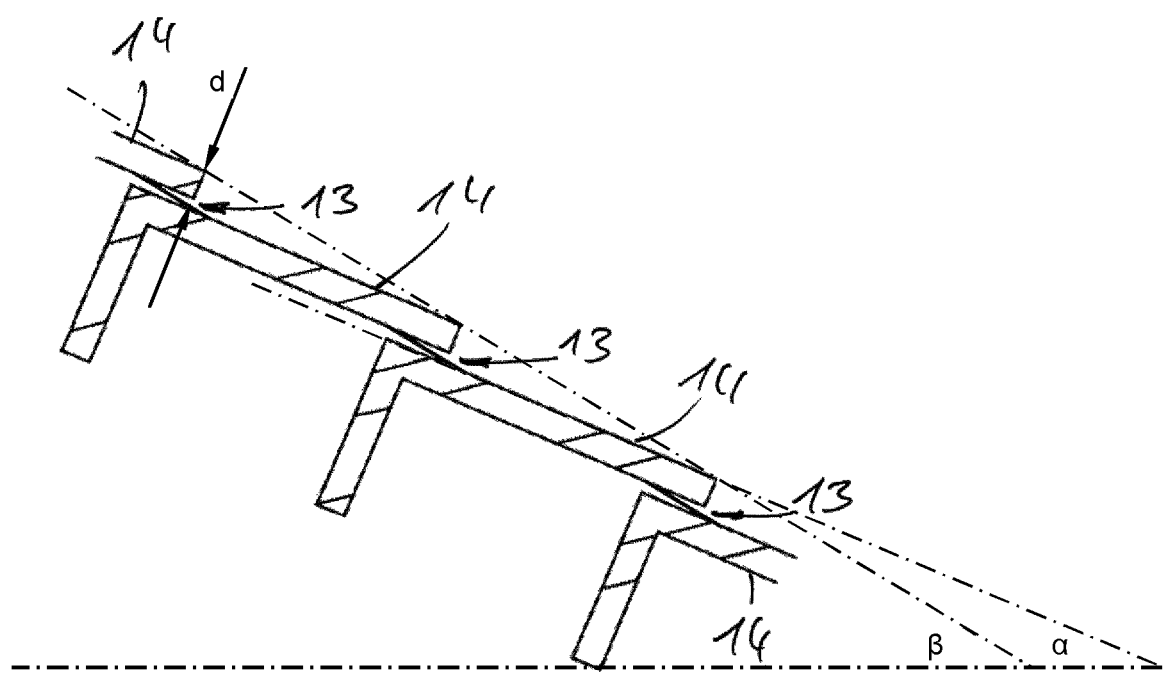
FIG. 9b shows the detail view of FIG. 9a at a correct installation angle.
Figure 10:
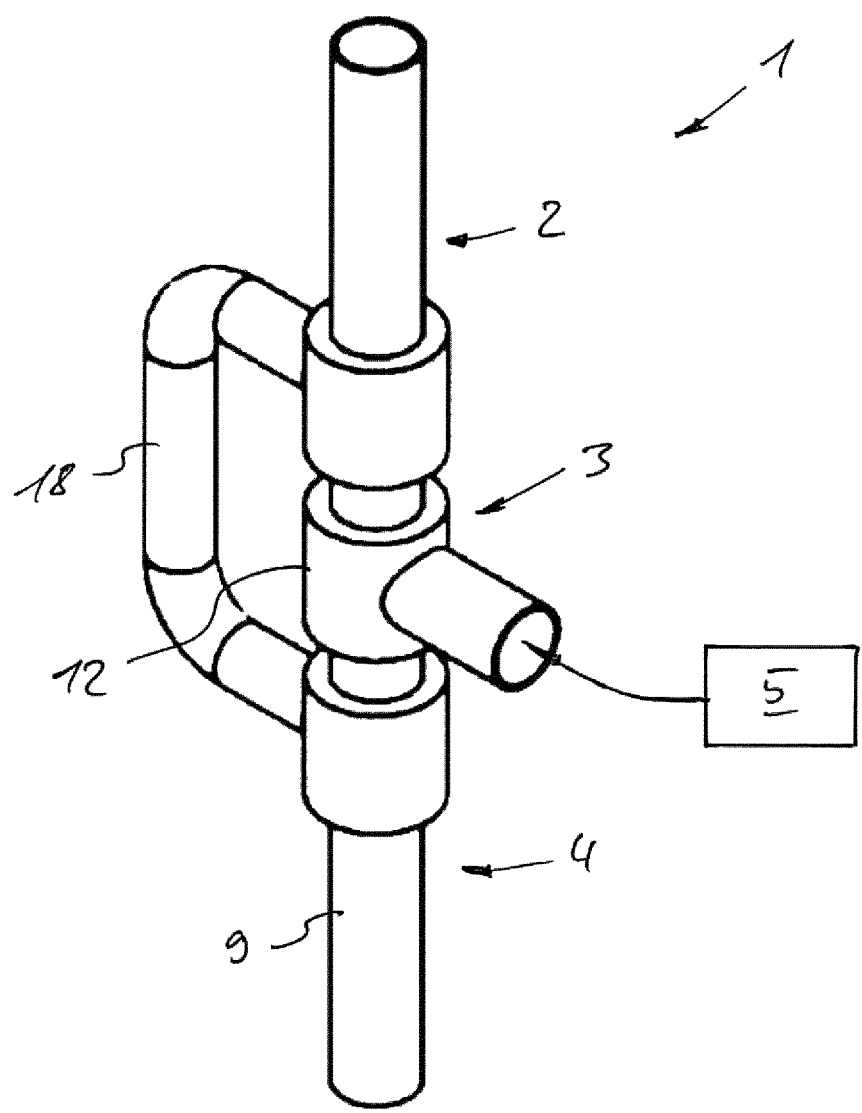
FIG. 10 shows a perspective front view of a device according to a second embodiment of the present invention.
Figure 11:
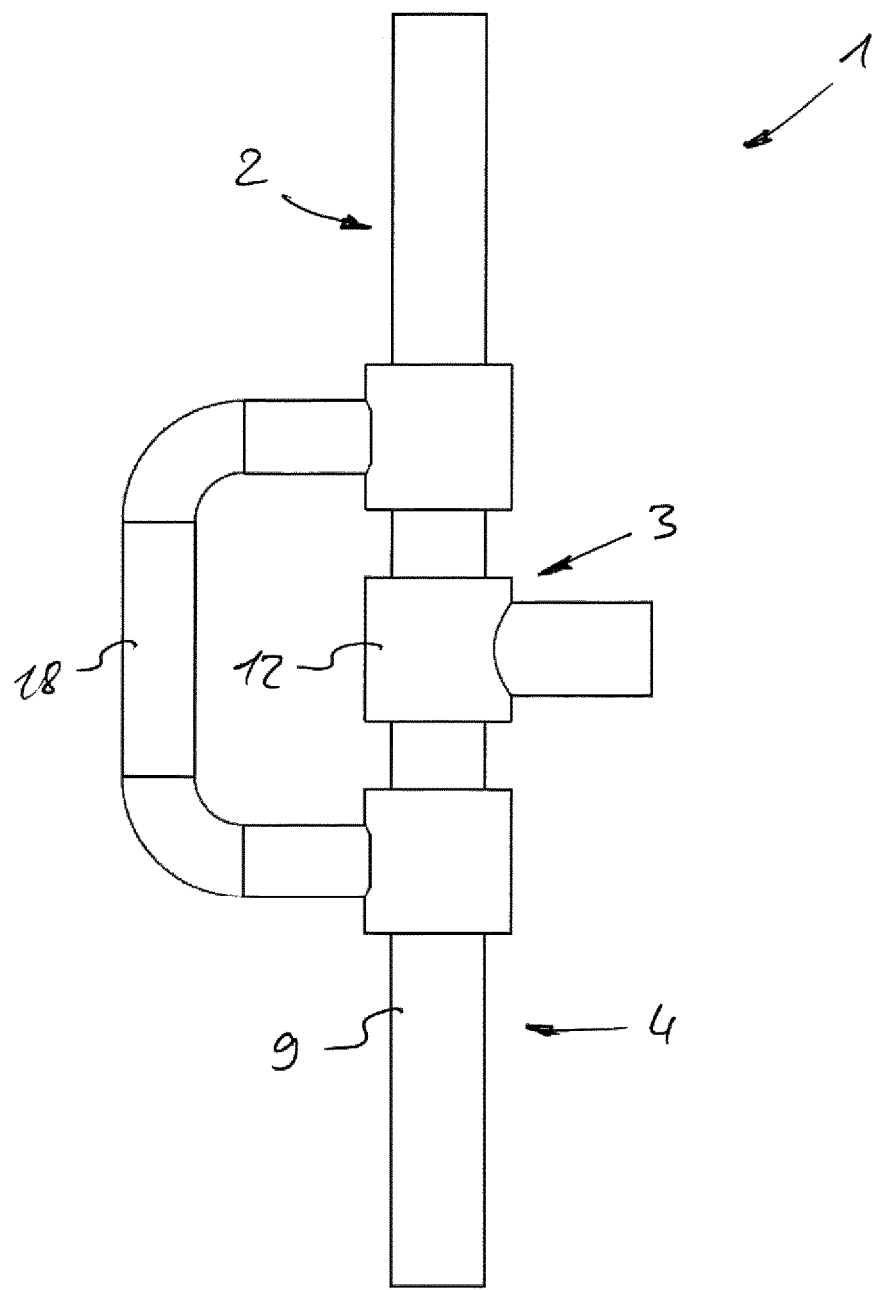
FIG. 11 shows a side view of the device shown in FIG. 10.
Figure 12:
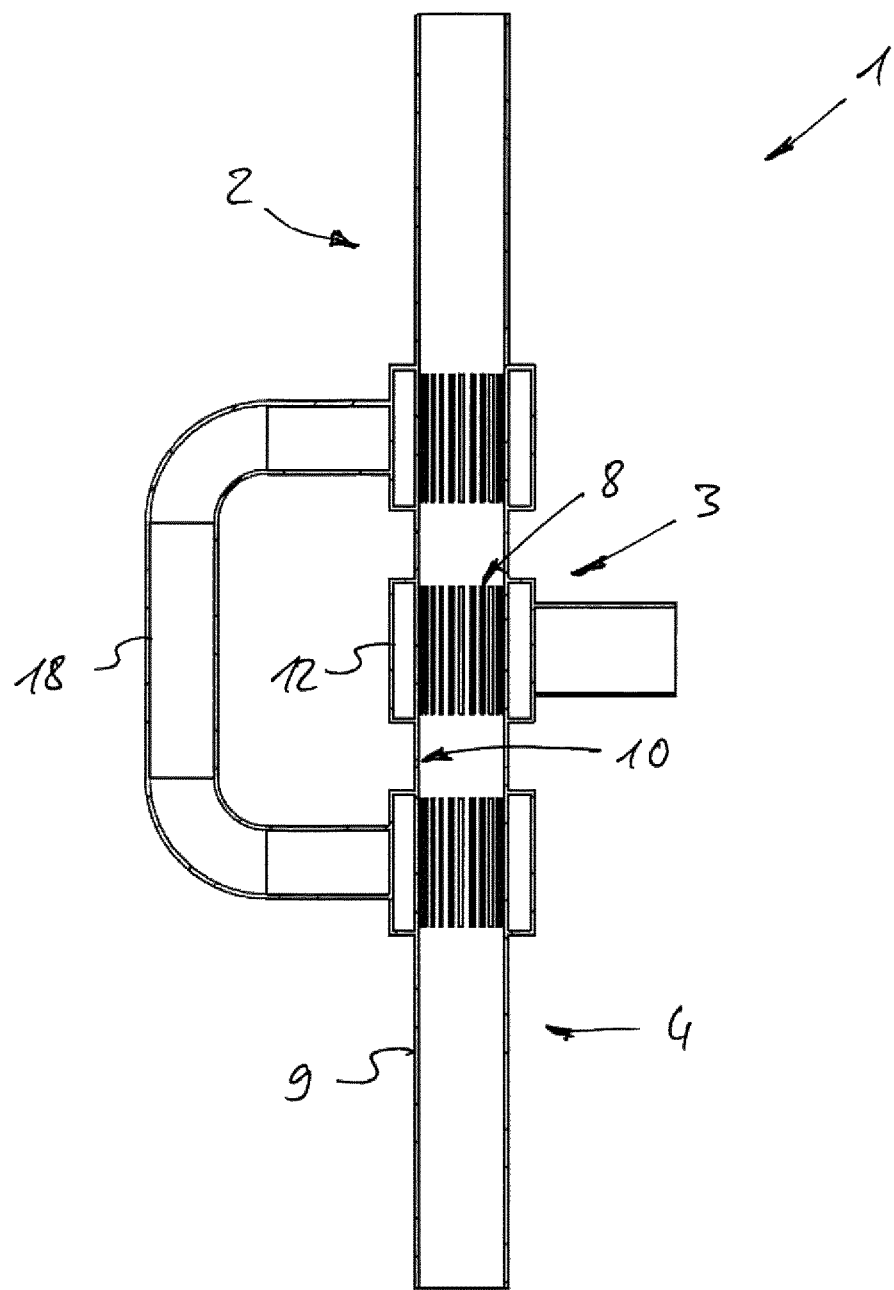
FIG. 12 shows a longitudinal section view of the device shown in FIGS. 10 and 11.
Figure 13:
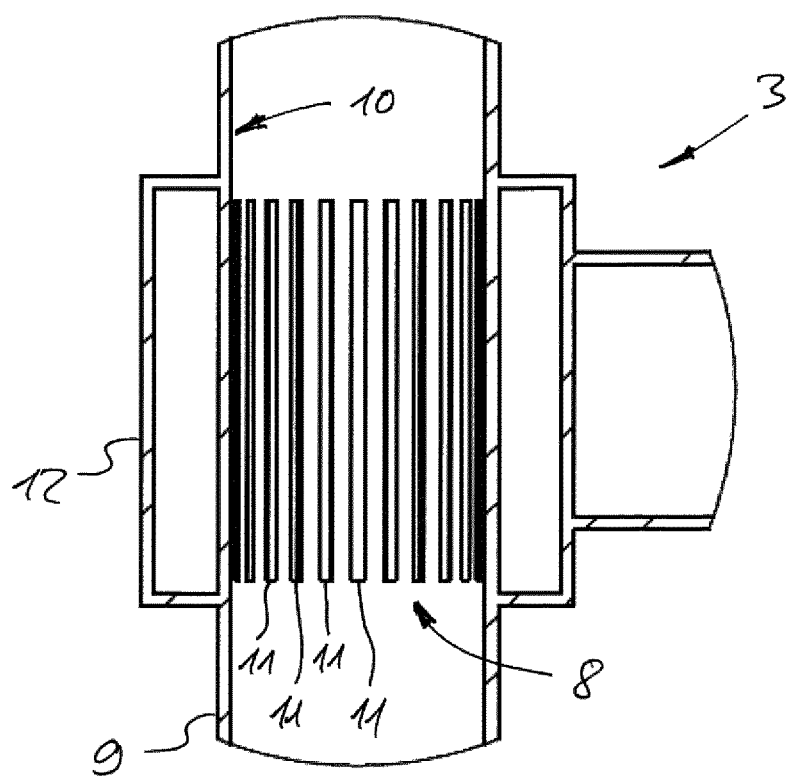
FIG. 13 shows a detail view of the kiln section of the device as shown in section view of FIG. 12.

In FIGS. 4 and 5, the grate plates 7 are only schematically shown. FIGS. 6 to 9b show the grate plates in more detail. Each grate plate 7 comprises a plurality of solid slats 14 that overlap each other in a roof tile manner in such a way that the solid granular material can slide down in an isokinetic motion. This means that no barriers or thresholds are present that would cause local blocking and tumbling of the solid granular material. As best shown in FIGS. 9a and 9b, a slot or gap 13 exists between two consecutive overlapping slats 14. The hot gas can pass through the grate plate 7 through these slots 13. According to a preferred embodiment of the present invention, the gas passes from underneath the grate plate through the slots 13 and the solid material to a space above the solid material. In this embodiment, blocking of the slots 13 by fine material is avoided. A sloping angle α between the horizontal plane and an upper surface of each slat is greater than or equal to 20°. In the embodiment shown in FIG. 9b, the sloping angle α is approximately 22°. The resulting angle β of the grate plate is defined between the horizontal plane and an enveloping plane touching the lower ends of the overlapping slats. The resulting angle β must be less than or equal to 55°. In the embodiment shown in FIG. 9b, the resulting angle β is approximately 31°. It must be ensured that the resulting angle β of the grate plate is less than the angle of repose of the solid material. Advantageously, the thickness of the gaps or slots 13 is in the range between 1 mm and 10 mm, preferably between 1.5 mm and 5.0 mm. Furthermore, the thickness d of the slats 14, at least of a portion of the slat that overlaps another slat, is within the range between 1 mm and 10 mm, preferably between 2 mm and 5 mm.

FIGS. 10 to 13 show an alternative second embodiment of the device 1 according to the present invention. We would like to stress that the drawings are only schematic. Instead of a vertical tower according to the embodiment shown in FIGS. 1 to 4, preheater 2, kiln 3 and cooler 4 are formed by a simple vertical pipe 9 that does is not equipped with grate plates. Instead, the inner wall 10 of the pipe (shown in FIGS. 12 and 13) forms a sliding surface along which the solid granular material slides down. The kiln section 3 shown in detail in FIG. 13 comprises a kiln gas inlet 8 consisting of a plurality of slots 11 extending parallel to the axis of pipe 9. In order to avoid blocking of the material in the kiln section, the pipe preferably widens slightly in a downward direction at least in the region of the slots 11. The hot gas generated in the external heat generator 5 is evenly distributed to the slots 11 via an annular manifold 12.

According to the invention and in order to increase the efficiency of the device, the device 1 is provided with a bypass 18 through which heated cooling gas from the upper end of cooler 4 is bypassed to the preheater 2. The devise is equipped with a similar discharging device as the discharging device 19 shown in FIG. 1, to ensure correct material retention time of the material to be heat treated.

Figure 14:
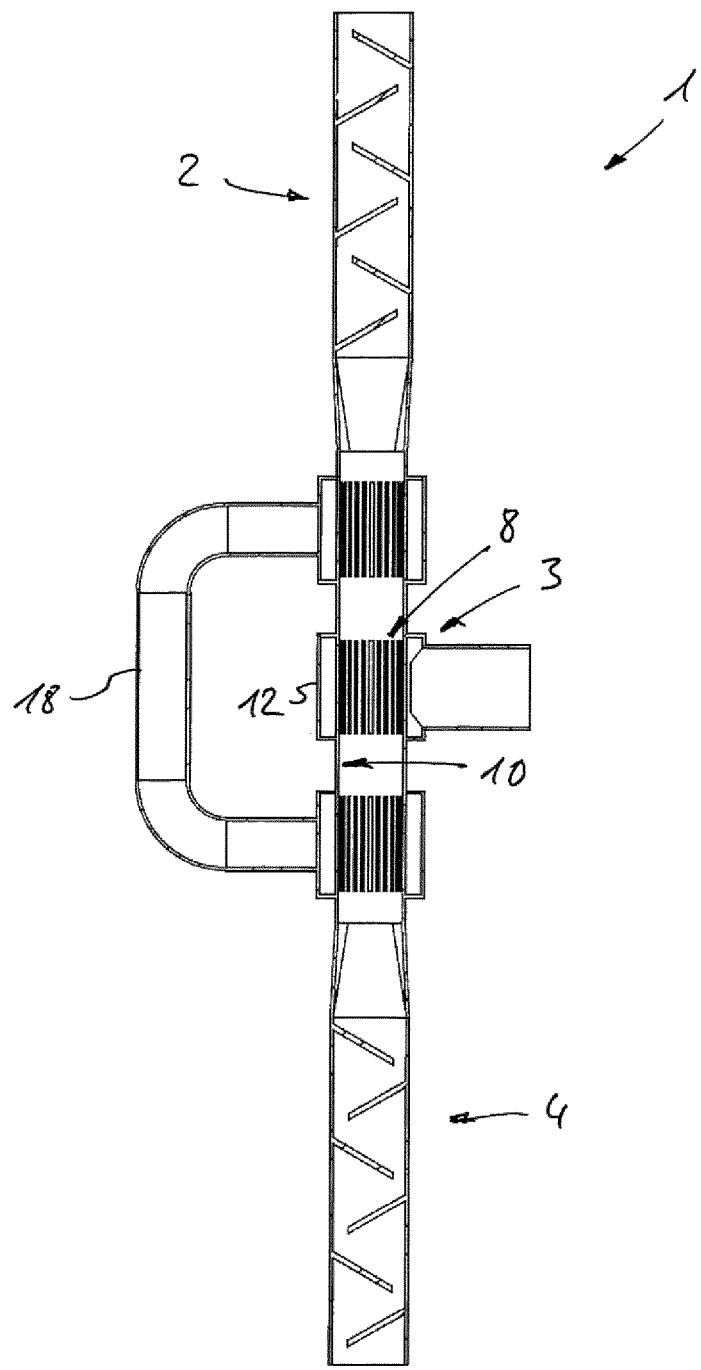
FIG. 14 shows a longitudinal section view of a device according to a third embodiment of the present invention.

FIG. 14 shows a device 1 according to a third embodiment of the present invention. The kiln 3 of the device 1 corresponds to the kiln of the embodiment shown in FIGS. 10 to 13 whereas preheater 2 and cooler 4 correspond to the design shown in FIGS. 1 to 5.

Figure 15:
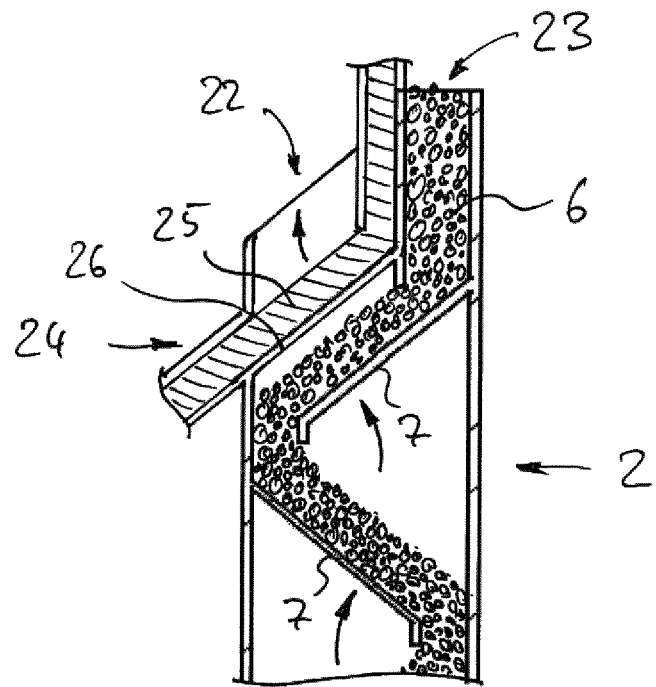
FIG. 15 shows a longitudinal detail section view of the upper portion of the devices shown in FIGS. 4 and 14 according to a further embodiment.
Figure 16:
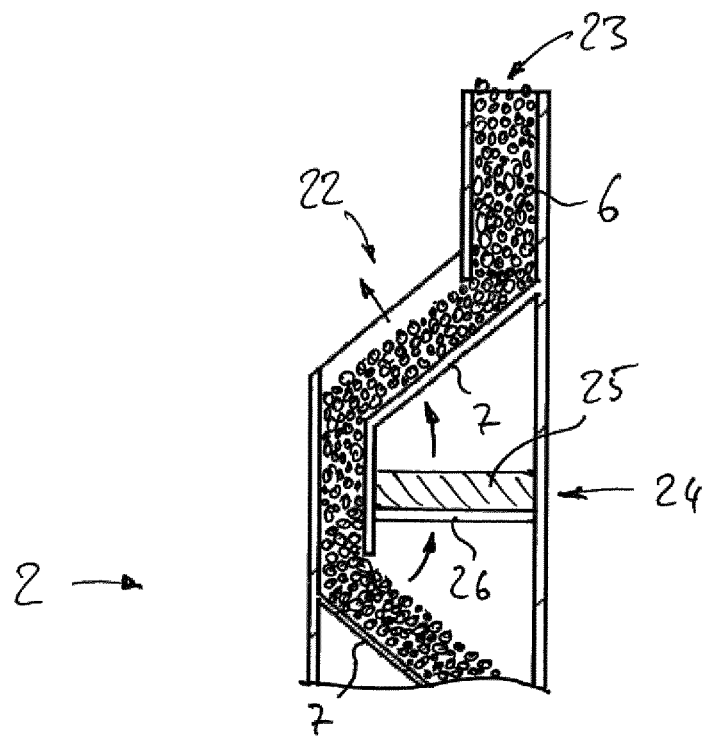
FIG. 16 shows a longitudinal detail section view of the upper portion of the devices shown in FIGS. 4 and 14 according to another embodiment.

As shown in FIGS. 15 and 16, the device 1 may comprise an absorbing or catalyzing section 24 in which the emission of, for example, SO2, HCl, TOC, NOx etc. is reduced in that the gas used in cooler, kiln and preheater is led through an absorbing or catalyzing material 25 before it is released into the atmosphere. To this end, the absorbing or catalyzing material 25 is conveyed over a grate plate 26 similar to the grate plates 7. FIG. 15 shows an embodiment with the absorbing or catalyzing section being the top section of the preheater. The stream of absorbing or catalyzing material can run parallel to the first grate plate 7 of the preheater 2. The arrows symbolize the flow direction of the gas. FIG. 16 shows an embodiment with the absorbing or catalyzing section being arranged between two preheater sections (between two preheater grate plates). In this case, the flow of absorbing or catalyzing material runs into or out of the image plane. The vertical transition zone between the first two grate plates 7 is extended such that the solid material is bypassed past the absorbing or catalyzing section 24. The embodiments shown in FIGS. 15 and 16 are suitable for the devices shown in FIGS. 1 to 5 and 14.

LIST OF REFERENCE SIGNS 1 heat-treating device
2 preheater
3 kiln
4 cooler
5 external heat generator
6 solid material
7 grate plate
8 kiln gas inlet
9 pipe
10 inner wall of pipe
11 kiln gas inlet slot
12 manifold
13 grate plate slot
14 solid grate plateslat
15 bypass
16 bypass IN
17 bypass OUT
18 bypass
19 discharging device
20 grate plate lower end
21 gas inlet
22 gas outlet
23 feeder
24 absorbing/catalyzing section
25 absorbing/catalyzing material
26 absorbing/catalyzing material grate plate
d thickness of solid grate plate slat 14
α angle between solid grate plate slat 14 and the horizontal plane
β angle between grate plate and the horizontal plane

SEQUENCE LISTING

Not applicable.

The invention claimed is:

1. A device for heat-treating solid material in granular form, wherein the device comprises a kiln and an external heat generator wherein said kiln comprises at least one sloped sliding surface on which a bed of said solid material slides down within said kiln due to gravity while a hot gas generated by the external heat generator is led through said solid material to heat said solid material to a desired temperature in order to change the substance properties of said solid material, wherein said sliding surface is formed by at least one grate plate through which said hot gas passes, and wherein said grate plate comprises a plurality of overlapping slats, wherein said external heat generator for generating said hot gas is external to said kiln, wherein said kiln further comprises at least one kiln gas inlet through which said hot gas enters said kiln such that the necessary temperature of said hot gas can be controlled precisely in that said hot gas is generated in said external heat generator, ensuring that the solid material does not experience temperatures above an allowed maximum temperature, and further such that the solid material is not exposed to radiation from a burner.

2. The device according to claim 1, wherein the device further comprises a kiln and a heat generator, wherein said kiln comprises at least one sloped sliding surface on which said solid material slides down due to gravity while a hot gas generated by the heat generator is led through said solid material to heat said solid material to a desired temperature in order to change the substance properties of said solid material, wherein said sliding surface is adapted to allow an isokinetic motion of said solid material along said sliding surface.

3. The device according to claim 1, wherein said kiln does not comprise any moving parts that come into contact with said solid material in order to effect movement of the solid material, such that the solid material automatically slides down along the sliding surface merely due to gravity and without the need of any pusher or moving means of the kiln.

4. The device according to claim 1, wherein said grate plate comprises a plurality of small gas openings through which said hot gas passes, wherein a combined flow cross-section of said plurality of small gas openings is smaller than a combined flow cross-section formed by spaces between overlying solid material.

5. The device according to claim 1, wherein a sloping angle α between the horizontal plane and an upper surface of each slat is greater than or equal to 10° or greater than or equal to 20°.

6. The device according to claim 1, wherein a resulting angle β of the grate plate being defined between the horizontal plane and an enveloping plane touching the lower ends of the overlapping slats, is less than or equal to 55°.

7. The device according to claim 1, wherein the overlapping slats of the grate plate are held such that a gap is formed between a lower end of the respective overlapping slat and an upper end of the respective overlapped slat, the gaps between the overlapping slats forming gas openings through which said hot gas passes.

8. The device according to claim 1, wherein said kiln comprises several sloped sliding surfaces arranged in a zigzag manner one above the other.

9. The device according to claim 1, wherein kiln comprises several kiln sections, wherein each kiln section is provided with a separate kiln gas inlet.

10. The device according to claim 1, wherein said device further comprises a preheater for preheating said solid material before it enters the kiln and a cooler for cooling said heat-treated solid material exiting said kiln, wherein the cooler, the kiln and the preheater are arranged in vertical alignment one above the other, respectively.

11. The device according to claim 1, wherein the device comprises at least one absorbing or catalyzing section in which the gas is led through an absorbent or catalyzing material in order to reduce emissions.

12. A device for heat-treating solid material in granular form, wherein the device comprises a kiln and an external heat generator wherein said kiln comprises at least one sloped sliding surface on which a bed of said solid material slides down within said kiln due to gravity while a hot gas generated by the external heat generator is led through said solid material to heat said solid material to a desired temperature in order to change the substance properties of said solid material, wherein said external heat generator for generating said hot gas is external to said kiln, wherein said kiln further comprises at least one kiln gas inlet through which said hot gas enters said kiln such that the necessary temperature of said hot gas can be controlled precisely in that said hot gas is generated in said external heat generator, ensuring that the solid material does not experience temperatures above an allowed maximum temperature, and further such that the solid material is not exposed to radiation from a burner, wherein said device further comprises a preheater for preheating said solid material before it enters the kiln and a cooler for cooling said heat-treated solid material exiting said kiln, wherein the cooler, the kiln and the preheater are arranged in vertical alignment one above the other, respectively, wherein the device further comprises at least one bypass for guiding cooling gas used for cooling the heat-treated solid material in the cooler, after having been heated by the heat-treated solid material, to the preheater.

13. The device according to claim 12, wherein the device further comprises a discharging device for extracting said solid material at a lower end of said cooler at a controlled discharging rate.

14. A device for heat-treating solid material in granular form, wherein the device comprises a kiln and an external heat generator wherein said kiln comprises at least one sloped sliding surface on which a bed of said solid material slides down within said kiln due to gravity while a hot gas generated by the external heat generator is led through said solid material to heat said solid material to a desired temperature in order to change the substance properties of said solid material, wherein said external heat generator for generating said hot gas is external to said kiln, wherein said kiln further comprises at least one kiln gas inlet through which said hot gas enters said kiln such that the necessary temperature of said hot gas can be controlled precisely in that said hot gas is generated in said external heat generator, ensuring that the solid material does not experience temperatures above an allowed maximum temperature, and further such that the solid material is not exposed to radiation from a burner, wherein said device further comprises a preheater for preheating said solid material before it enters the kiln and a cooler for cooling said heat-treated solid material exiting said kiln, wherein the cooler, the kiln and the preheater are arranged in vertical alignment one above the other, respectively, wherein the preheater comprises several preheating sections in which preheating of the solid material occurs in several preheating steps, wherein the cooler comprises several cooling sections in which cooling of the solid material occurs in several cooling steps, and wherein the device is adapted and configured such that gas can be extracted or added in at least one or in all of said preheating and cooling steps.

* * * * *